US010049400B2

(12) United States Patent
Caralis et al.

(10) Patent No.: US 10,049,400 B2
(45) Date of Patent: *Aug. 14, 2018

(54) SYSTEMS AND METHODS FOR GENERATING LOCATION-BASED GROUP RECOMMENDATIONS

(71) Applicant: PAYPAL, INC., San Jose, CA (US)

(72) Inventors: Jim Caralis, Winthrop, MA (US); Nataly Kogan, Newton, MA (US); Masumi Nakamura, Cambridge, MA (US); Michael Mastroianni, Brookline, MA (US); Jason Sundram, Somerville, MA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,829

(22) Filed: Nov. 14, 2017

(65) Prior Publication Data

US 2018/0068373 A1 Mar. 8, 2018

Related U.S. Application Data

(63) Continuation of application No. 15/414,601, filed on Jan. 24, 2017, now Pat. No. 9,818,146, which is a
(Continued)

(51) Int. Cl.
*H04W 24/00* (2009.01)
*G06Q 30/06* (2012.01)
(Continued)

(52) U.S. Cl.
CPC ......... *G06Q 30/0631* (2013.01); *G06Q 50/01* (2013.01); *H04L 67/306* (2013.01);
(Continued)

(58) Field of Classification Search
CPC .. G06Q 30/0631; G06Q 50/01; H04L 67/306; H04L 67/18; H04W 4/21; H04W 4/021;
(Continued)

(56) References Cited

U.S. PATENT DOCUMENTS 6,438,579 B1 * 8/2002 Hosken ............. G06F 17/30867
707/999.002
6,618,593 B1 * 9/2003 Drutman ............ G08B 21/0222
455/456.3

(Continued)

FOREIGN PATENT DOCUMENTS

WO WO 2014092790 A1 * 6/2014 ............. H04W 4/02
WO WO 2014151792 A3 * 11/2014 ........ G06W 30/0267

*Primary Examiner* — Mahendra Patel
(74) *Attorney, Agent, or Firm* — Maschoff Brennan

(57) ABSTRACT

Methods and systems for generating location-aware group recommendations are discussed. For example, a method can include operations for receiving a group recommendation request, accessing user profile data associated with members of the group, and generating a group recommendation. The group recommendation request can be received at a network-based system and include identification of a first and second user as well as information identifying a current location associated with the first and second users. Accessing the user profile information can include accessing user profile information for both the first and second users. The group recommendation can be generated based on the current location data and a combination of at least a portion of the user profile data from the first and second users.

20 Claims, 10 Drawing Sheets

Related U.S. Application Data continuation of application No. 15/011,985, filed on Feb. 1, 2016, now Pat. No. 9,552,605, which is a continuation of application No. 13/913,768, filed on Jun. 10, 2013, now Pat. No. 9,251,536, which is a continuation of application No. 13/313,681, filed on Dec. 7, 2011, now Pat. No. 8,463,295.

(51) Int. Cl.
| | | |
|---|---|---|
| *H04W 4/20* | (2018.01) | |
| *H04W 4/021* | (2018.01) | |
| *H04L 29/08* | (2006.01) | |
| *G06Q 50/00* | (2012.01) | |
| *H04W 4/21* | (2018.01) | |

(52) U.S. Cl.
CPC ........... *H04W 4/021* (2013.01); *H04W 4/206* (2013.01); *H04W 4/21* (2018.02)

(58) Field of Classification Search
CPC ....... H04W 24/00; H04W 4/02; H04W 4/001; H04W 4/50; H04W 4/60; H04W 4/029; H04W 4/023; G08B 21/0222; G08B 21/028; G08B 21/0283; G08B 21/0294; H04M 3/42
USPC .......................... 455/456, 1; 706/62; 701/533
See application file for complete search history.

(56) References Cited

U.S. PATENT DOCUMENTS

| | | | |
|---|---|---|---|
| 6,718,551 B1* | 4/2004 | Swix | G06Q 30/02 348/E7.075 |
| 2002/0178057 A1* | 11/2002 | Bertram | G06Q 30/02 705/14.23 |
| 2004/0039579 A1* | 2/2004 | Chithambaram | G06Q 10/109 705/319 |
| 2004/0162830 A1* | 8/2004 | Shirwadkar | G06F 17/30867 |
| 2004/0203901 A1* | 10/2004 | Wilson | H04W 64/00 455/456.1 |
| 2006/0047825 A1* | 3/2006 | Steenstra | H04W 4/02 709/229 |
| 2006/0282856 A1* | 12/2006 | Errico | G06F 17/30035 725/46 |
| 2008/0097822 A1* | 4/2008 | Schigel | G06Q 10/063 705/7.33 |
| 2009/0063568 A1* | 3/2009 | Choe | G06F 17/30035 |
| 2009/0100037 A1* | 4/2009 | Scheibe | G06F 17/3087 |
| 2009/0163183 A1* | 6/2009 | O'Donoghue | G06Q 30/02 455/414.1 |
| 2009/0239552 A1* | 9/2009 | Churchill | G06Q 30/02 455/456.3 |
| 2010/0153324 A1* | 6/2010 | Downs | G06F 17/2745 706/21 |
| 2010/0251305 A1* | 9/2010 | Kimble | H04N 7/17318 725/46 |
| 2011/0289433 A1* | 11/2011 | Whalin | G06F 17/30964 715/753 |

* cited by examiner

SYSTEMS AND METHODS FOR GENERATING LOCATION-BASED GROUP RECOMMENDATIONS

CROSS-REFERENCE TO RELATED APPLICATIONS

This continuation patent application claims priority to and the benefit of U.S. patent application Ser. No. 15/414,601, filed Jan. 24, 2017, now issued as U.S. Pat. No. 9,818,146, on Nov. 14, 2017; which is a continuation of U.S. patent application Ser. No. 15/011,985, filed on Feb. 1, 2016, now U.S. Pat. No. 9,552,605, issued Jan. 24, 2017; which is a continuation of U.S. patent application Ser. No. 13/913,768, filed on Jun. 10, 2013, now U.S. Pat. No. 9,251,536, issued Feb. 2, 2016; which is continuation of U.S. patent application Ser. No. 13/313,681, filed on Dec. 7, 2011, now U.S. Pat. No. 8,463,295, issued Jun. 11, 2013; the disclosures of all of these applications and patents are incorporated by reference herein.

TECHNICAL FIELD

This application relates generally to data processing within a network-based system operating over a distributed network, and more specifically to systems and methods providing an infrastructure to support localized personalized pricing.

BACKGROUND

The explosion of information available over network-based systems, such as the Internet, can overwhelm a person attempting to locate a desired piece of information or product. For example, a person looking for a place to eat or a local entertainment event can search the Internet, but is likely to either be overwhelmed by the volume of data or unable to locate any relevant information. The dramatic growth in the amount of information available via the Internet has left users with the problem of sorting and browsing through enormous amounts of data to find information relevant to their needs. Targeted search services and recommendation engines have been implemented to attempt to assist users in locating relevant information or products. A successful recommendation system not only saves users time in locating relevant information (e.g., a place to eat or product to purchase) but can also drive extra profits through advertising or additional sales revenue for the service provider operating the search service or recommendation engine.

The advent of Internet connected smartphones, such as the iPhone (from Apple, Inc. of Cupertino, Calif.), has compounded the problem by making the vast amounts of information available via the Internet available anywhere. Smartphones also typically have location determination capabilities, adding to the available data for use by a search or recommendation engine. However, providing real-time location-aware recommendations presents significant challenges, and adding recommendations suitable for multiple people further complicates the situation.

Traditional recommendation systems use some form of collaborative filtering to reduce the volume of information found through simple keyword or natural language searching. Two different basic types of collaborative filtering are typically employed by recommendation systems: user-based or item-based (or target-based). User-based collaborative filtering focuses on grouping like user behaviors. Item-based recommendation systems focus on grouping similar items. Commerce sites can use item-based recommendations that use collaborative filtering to provide recommendations based on the purchase history of users who bought similar products (e.g., users who bought X also bought Y and Z). Item-based recommendations can also be applied to things like restaurants or entertainment venues. However, collaborative filtering is limited, especially when location is added to the recommendation matrix. Attempting to provide a recommendation suitable for two or more people further complicates the recommendation matrix.

BRIEF DESCRIPTION OF THE DRAWINGS

Some embodiments are illustrated by way of example and not limitation in the figures of the accompanying drawings in which.

DEFINITIONS

Figure 1:
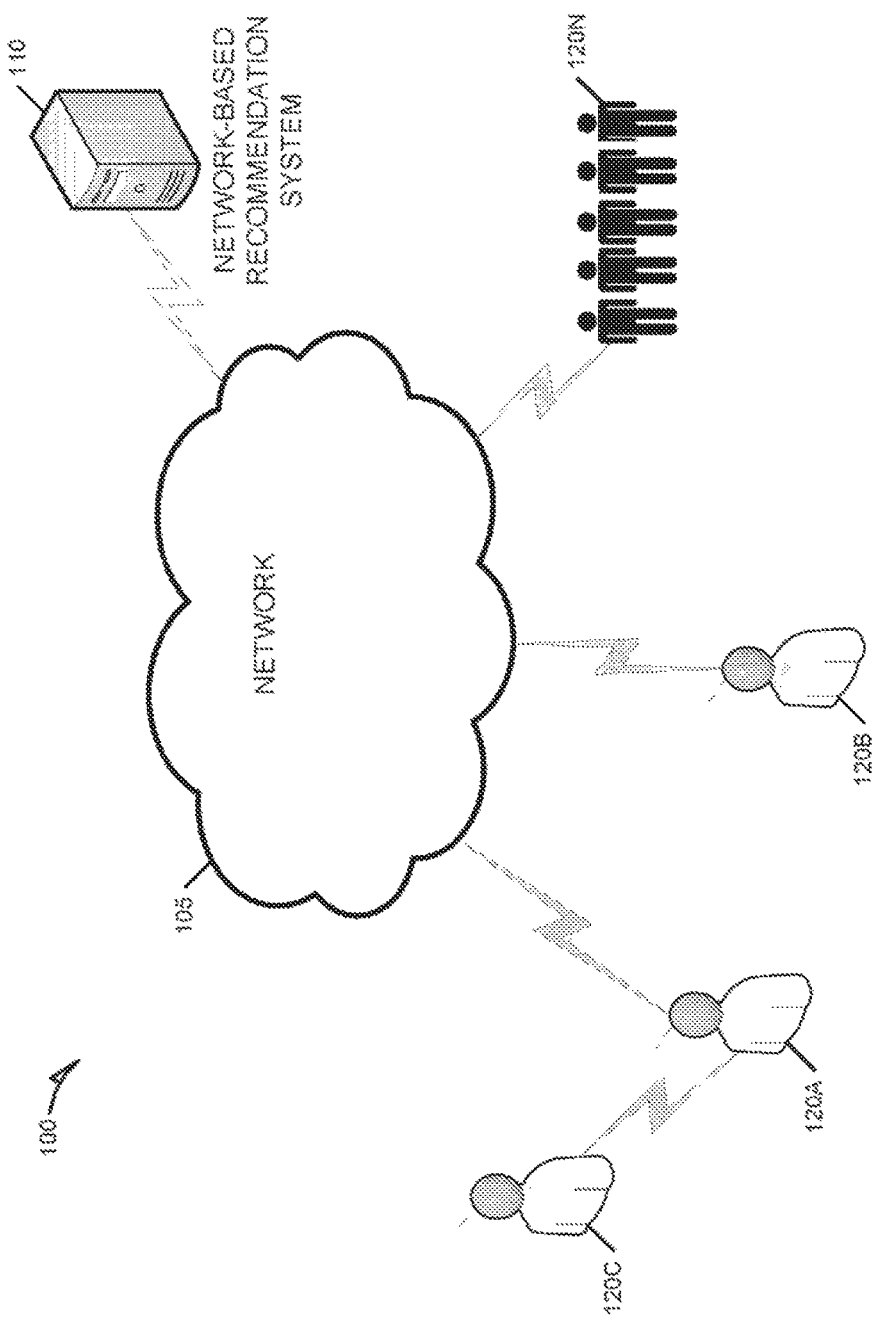
FIG. 1 is a block diagram depicting a system for delivering location-aware group recommendations, according to an example embodiment.

Place or Venue—For the purposes of this specification and the associated claims, the terms "place" and "venue" are used interchangeably to reference physical locations, such as restaurants, theaters, stadiums, or places of business, among others. A place or venue will have various attributes or features, such as a physical location, category, hours of operation, among others. The place or venue can also be categorized into multiple different categories, such as restaurant or Italian restaurant.

Location—For the purposes of this specification and the associated claims, the term "location" is used to refer to a geographic location, such as a longitude/latitude combination or a street address.

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

DETAILED DESCRIPTION

Example systems and methods for providing real-time location-aware group recommendations are described. The systems and methods for providing real-time location-aware group recommendations, in some example embodiments, may provide recommendations based on the past behavior of two different users interacting with a network-based system, such as a network-based location-aware recommendation system. The group recommendation can be generated based on demonstrated preferences associated with each of the users in the group. Additionally, in certain examples, the group recommendation can factor the relationship between the users in the group into the recommendation generation. For example, the generated recommendation may differ if the users are essentially strangers versus users associated via some form of social graph (e.g., social network). In the following description, for purposes of explanation, numerous specific details are set forth in order to provide a thorough understanding of example embodiments. It will be evident, however, to one skilled in the art that the present invention may be practiced without these specific details. It will also be evident that real-time location-aware group recommendations are not limited to the examples provided and may include other scenarios not specifically discussed.

The need for group recommendations occurs in a wide variety of situations with both known and previously unknown people. For example, it is often difficult to choose a place to eat with a group of friends and even worse with a new business contact. A system that applies preferences of each member of a group to a current location to make a recommendation can assist in solving or avoiding challenging social situations. In the scenario with a group of friends (e.g., members of a group with a previous relationship), a system can use a member's social graph from a social network to access user profile data associated with other members of the group and generate a recommendation based on a current location. For example, if a person gathers at a bar with a couple friends, a location-aware group recommendation system can generate a restaurant recommendation based on user profile data associated with each member of the group. In a business scenario where two people have just met at a conference, a location-aware group recommendation system can also generate a restaurant recommendation based on user profile data. However, in the business scenario, one of the users may need to provide user profile data associated with each person (or at least information necessary to access the required information). In this scenario, a user registered with the recommendation system can obtain the other person's profile data via some form of mobile device interaction (e.g., near-field communication (NFC), IEEE 802.11x (WiFi), Bump, peer to peer networking protocols (P2P), or Bluetooth).

In accordance with an example embodiment, a network-based system can provide group recommendations based on a group of users, data indicating a current location associated with the group of users, and past user interactions with the network-based system associated with each member of the group. In some examples, a user interacts with the network-based system via a mobile device, such as a smartphone, a tablet computing device, or an Internet enabled personal digital assistant (PDA), among others. In an example, the network-based system can include a recommendation subsystem capable of deriving location-aware recommendations and communicating the recommendations to a user's mobile device in near real-time. Producing real-time location-aware group recommendations may require (or at least benefit significantly from) on-the-fly calculations, as pre-programmed (pre-compiled) recommendations are not effective when both user profile data (e.g., preferences as well as explicit and implicit behaviors) and location data are used to generate the recommendations.

In a traditional collaborative filtering recommendation system, such as might be used to recommend movies (e.g., movie recommendations on NETFLIX.COM from Netflix, Inc. of Los Gatos, Calif.), the recommendation system can use viewing history from multiple people across multiple geographies to develop pre-compiled recommendations. The location of the viewer is either irrelevant or at best only very broadly applicable to the recommendations. Additionally, as will be discussed in more detail below, the recommendation engine can have many more inputs available, as people generally view movies more often than they visit local points of interest (e.g., restaurants or entertainment venues).

In contrast, location-aware recommendation engines may have far fewer inputs to work with in generating a recommendation. Users typically only visit local establishments a couple times a week and also tend to visit the same locations more frequently. Thus, the location-aware recommendation engine may benefit from using algorithms that go beyond simple collaborative filtering. In an example embodiment, a location-aware recommendation system can generate a graph of places, referred to herein as a place graph, to enable personalized recommendations and new discoveries. The place graph contains physical locations as nodes interconnected by inherent or user specific relationships (also referred to as features). In an example, a location-aware group recommendation system can merge place graphs from multiple users to generate a recommendation suitable for all members of the group. In an example, a place graph can also be referred to as a directed acyclic graph (DAG). In an example, the DAG is rooted in a favorate place (the "root") with weighted edges representing connections between nodes of the DAG. The nodes, which each can have a rank and score, represent places.

According to an example, a place graph can be generated from multiple inputs, including general information about the physical locations and user inputs. The general information about the physical locations can include location (e.g., longitude/latitude, street address, etc.), category (e.g., restaurant, bar, etc.), and reviews, among other things. The user inputs can include both implicit and explicit interactions with physical locations. The recommendation system can then use machine learning, similarity metrics, and predictive analytics to generate a place graph for a particular user in a particular location. The algorithms used by the recommendation system allow for real-time projection of a user's implicit and explicit interactions in one location to be projected onto a new location to produce recommendations relevant to both the user's demonstrated interests and the venues (e.g., restaurants, entertainment events, etc.) available in the new location. In an example, projection of a user's implicit and explicit interactions in one location to a new location includes filtering places in the new location through a spatial filtering mechanism (e.g., center point and radius).

The inputs used in certain example embodiments can include three general buckets: explicit interactions, implicit interactions, and place (location) information. Explicit interactions can include ratings, reviews, check-ins, saving places into an address book, or another explicit action taken by a user that can be positively interpreted to indicate a preference regarding a venue. Explicit interactions are inputs from users that directly reveal the users preferences and choices. Implicit interactions are passive by-products of searching, browsing, or interacting with a mobile application. For example, an implicit interaction can be recorded when a user clicks on an online detail page of a local venue. Merely clicking on a detail page for a venue does not positively identify the user's intent regarding the venue. In some cases the user may read the detail page and decide that they do not like the venue (or are unlikely to like the venue). The recommendation system may infer some interest in a venue based on a user's implicit interactions, but these implicit interactions can be handled differently from explicit interactions by the recommendation system. Finally, the recommendation system uses place or venue information as an input to calculating a place graph.

In an example, the recommendation system uses specialized indexing and retrieval algorithms that leverage mathematical techniques and machine learning to identify patterns and relationships for venues based on the inputs described above. Given the inputs discussed above, the dynamically generated output consists of multiple levels of relationships of places for a particular user.

In an example, the recommendation system uses algorithms, such as principal component analysis (PCA) and/or singular value decomposition (SVD), to extract features across a set of locations within a geographical area. This machine based feature extraction can identify similarities between locations that are not readily apparent to users. For example, an extracted similarity feature might be something like "restaurants that serve expensive food downtown and have award winning deserts." The features are often so arcane that it requires careful re-construction analyzing of two machine related locations to determine how the shared feature was developed. Thus, in these examples, this relationship (represented by the shared feature) is inferred, not implied—meaning these are the results of the mathematical algorithms that have been computed/inferred, and not directly or heuristically implied. In this example, dimensionality reduction can be applied to further the concept of inferring relationships between places (e.g., venues). These techniques enable an example recommendation engine to develop previously unknown connections among places, thereby allowing for new personalized discoveries to be presented to users as recommendations.

As mentioned above, explicit and implicit user interactions can be treated differently by the recommendation engine in developing a place graph. Although there sometimes appears to be a high correlation between implicit and explicit actions—between places that have been browsed and have been rated by a user—attempts to model explicit interactions from implicit interactions generally produces lower quality recommendations. In an example, the quality of a recommendation can be measured by whether the user acts upon a recommendation (either explicitly or implicitly). For example, historical user interaction data demonstrates that trying to predict a user's rating for a particular place based on the number of times that user has viewed the detailed page of that place has not proven reliable. While hybrid models can be applied, most example embodiments use probabilistic similarity metrics to calculate relationships among places in a certain geographic area (e.g., neighborhood, city, or metro area).

Generating a personalized place graph can be a difficult undertaking. As mentioned above, user-place interactions are generally sparse, and extremely sparse (or non-existent) in new geographical locations. To address the sparse data issue, the recommendation system can use dimensionality reduction and matrix factorization. In an example system, dimensionality reduction and matrix factorization are performed using the PCA and SVD algorithms mentioned above. By factorizing an original user-place-interaction matrix, the system can uncover hidden connections among places in different geographic locations based on user profile data and successfully build a place graph for new geographic locations (e.g., geographic locations where the user has limited or no explicit or implicit interactions with local places). In certain examples, the recommendation system can also leverage more traditional collaborative filtering techniques, particularly when a user initially starts using the recommendation system (e.g., cold start).

In an example, the recommendation system can create location-aware recommendations for a new geographic location. Unlike recommending movies, where a system can pre-compute the recommendation "lookup table" offline, a location-aware recommendation system must handle the local context and real-time response requirements imposed by modern mobile devices. As users move around with their mobile devices going to different places throughout the day, users demand that recommendations be constantly and dynamically recalculated according to the places around them (e.g., current geographic location) as well as other factors (such as time of day). Periodically calculating recommendations offline is not going to produce the results desired by mobile device users. Recommendation calculations need to be performed in real-time and with the user's current location in context.

In an example, the recommendation system can employ rapid place graph node traversal to solve the real-time location-aware recommendation problem discussed above. The recommendation system discussed herein is capable of constantly recalculating user recommendations and updating a recommended place list based on a user's previous places (e.g., user profile data) and relative to the user's current location. As a result, the discussed recommendation system is an optimal solution for local discovery that takes mobile usability into account.

In an example, as users interact with places (nodes within a place graph), the explicit and implicit interactions are mapped on a place graph (e.g., nodes and edges are updated). Paths can then be calculated within the place graph to reflect the user's local tastes (e.g., likes and dislikes); these paths can be referred to as taste paths. Based on these taste paths, the system can predict places the user may like in the current location.

As noted above, the recommendation system can use a hybrid model that takes into account information beyond a place graph, such as user profile information and social graph (e.g., social network connections). This additional information can be especially useful in a cold start scenario, where a user has not recorded many (or any) interactions either explicit or implicit. Additional information on place graph calculations and systems for personalized location-aware recommendations can be found in the provisional patent application Ser. No. 61/509,987, titled "Systems and Methods for Real-Time Location-Aware Recommendations," which is hereby incorporated by reference in its entirety.

A real-time location-aware group recommendation system can merge place graphs associated with multiple users to produce a recommendation suitable for the unique collection of people within the group. Because place graphs can be merged in real-time (or near real-time), the recommendation system does not need prior knowledge of the group members to produce a location-aware recommendation. In an example, a location-aware group recommendation system can generate a recommendation based on a location associated with the group and user identification information used to access user profile data associated with each member of a particular group.

Example System

FIG. 1 is a block diagram depicting a system 100 for delivering location-aware group recommendations, according to an example embodiment. In an example, the system 100 can include a network 105, a network-based recommendation system 110, and a plurality of users 120A-120N (collectively referred to as user or users 120). In certain examples, the users 120 can interact with the network-based recommendation system 110 over the network 105 via a mobile device (such as mobile device 205 discussed below in reference to FIG. 2 an FIG. 3).

In an example, a user, such as user 120B, can initiate a group recommendation by sending a request to the network-based group recommendation system 110. The recommendation request can include information (e.g., username and password credentials or other uniquely identifying data) identifying two or more users (e.g., user 120B and user 120A), which the network-based recommendation system 110 can use to access information about the users and generate a recommendation suitable for both users (e.g., a recommendation that both users are likely to accept or like). The recommendations can include recommendations for things to do, places to go, deals on products or services, or books and web sites that may be of common interest. Many of the examples discussed within this document focus on recommendations for places to go or things to do (e.g., a restaurant that all members of the group are likely to enjoy), but the described systems and methods are not limited to these types of recommendations.

In certain examples, the recommendation request can include information about each member of the group, which can be used by the network-based recommendation system 110 to generate a recommendation. In certain examples, the user information can be referred to generally as user profile data and may include things such as Internet browsing history, ratings for local establishments (e.g., restaurants and entertainment venues), check-in histories (e.g., a history of physical locations visited by the user), and purchase history information, among others. Obtaining user profile data can occur in multiple ways, ranging from receiving it directly from another user or collecting it from various online repositories (e.g., online merchants, social networks, and online service providers).

In an example, the user requesting the group recommendation will receive user profile data for other members of the group directly and include it with the request. For example, user 120A can receive user profile information for user 120C directly via their respective mobile devices. Smart phones running software from Apple Computer (of Cupertino, Calif.) or Google, Inc. (of Mountain View, Calif.) can exchange data through a variety of protocols or network-based services. For example, user 120A and user 120C can exchange data via the BUMP smart phone application (from Bump Technologies of Mountain View, Calif.). The BUMP smart phone application allows users to physically bump their mobile devices together, which triggers an exchange of data over a network, such as the Internet (e.g., network 105).

Alternatively, user 120A and 120C could exchange data via associated mobile devices over direct network connection between the mobile devices. Mobile devices can establish direct connections via IEEE 802.11x (WiFi) protocols, BLUETOOTH protocols, or via NFC protocols, to name a few.

In another example, the user requesting the group recommendations can merely provide information to identify the one or more additional users within the group. In this example, the network-based recommendation system 110 can use the user identification information to locate suitable user profile data. In some examples, the network-based recommendation system 110 can maintain user profile data for all registered users. In certain examples, the network-based recommendation system 110 can also access user profile data in third party systems. For example, the user identification information received by the network-based recommendation system 110 may be sufficient to access one or more social network systems (e.g., FACEBOOK) and access user profile data stored within these systems. In an example, a user (such as user 120A) requesting the recommendation can select other users with whom the user 120A is associated through one or more social graphs (associated with one or more social networks). These other users can then be included within a group recommendation. In this example, the network-based recommendation system 110 may access user profile data via the information provided by user 120A, which allows access to the social graph associated with user 120A.

In some examples, the recommendation request can be triggered by activities involving a group of registered users monitored by the network-based recommendation system 110. For example, if a group of users all use a particular smartphone application to check-in at various physical locations, the network-based recommendation system 110 can use check-in information to trigger a recommendation. If two or more users check-in at the same location, the network-based recommendation system 110 can automatically generate a group recommendation (or a series of group recommendations) for the ad hoc group of users. One example smart phone application that enables checking in at physical locations (e.g., check-ins) is foursquare (from Foursquare, Inc. of New York, N.Y.).

Example Operating Environment

Figure 2:
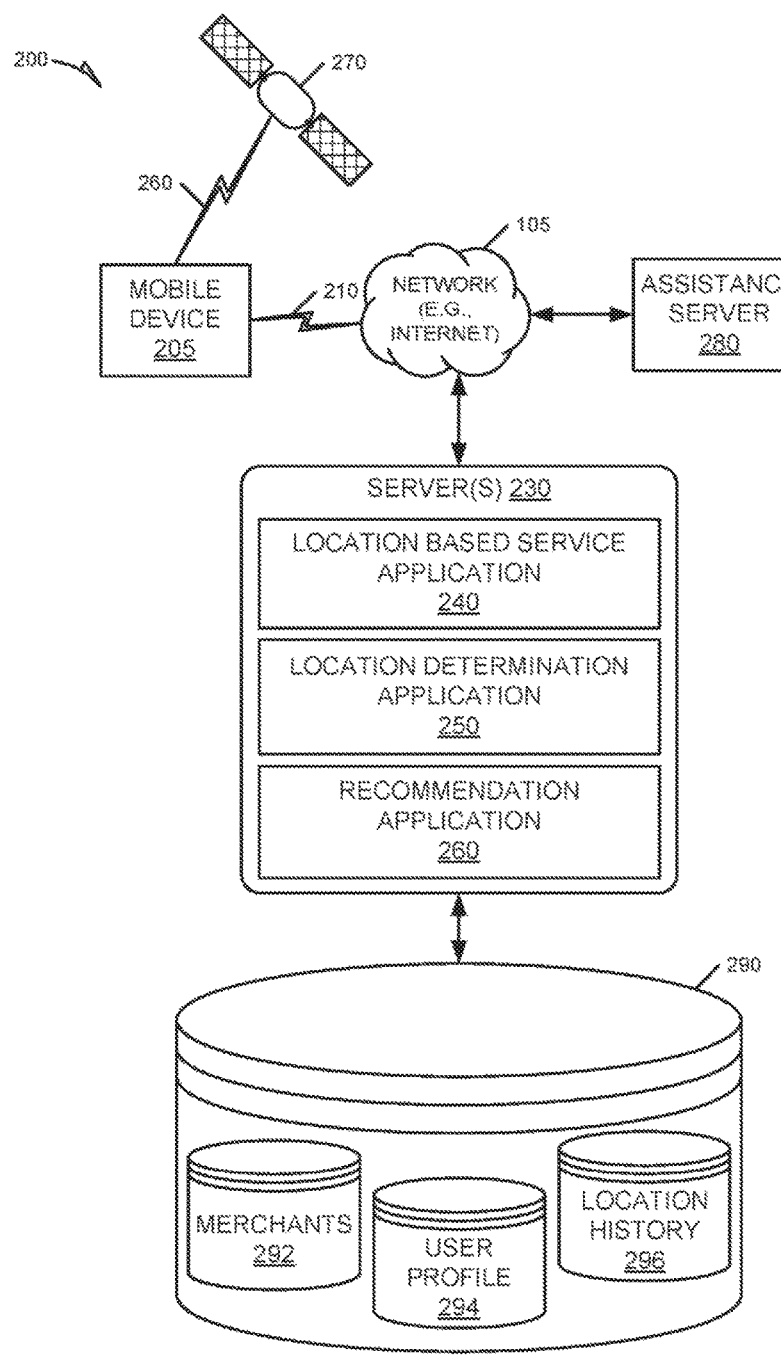
FIG. 2 is a block diagram illustrating an environment for operating a mobile device, according to an example embodiment.

FIG. 2 is a block diagram illustrating an environment 200 for operating a mobile device 205, according to an example embodiment. The environment 200 is an example environment within which methods of generating and delivering location-aware group recommendations can be operated. The environment 200 can include a mobile device 205, a communication connection 210, a network 105, servers 230, a communication satellite 270, a assistance server 280, and a database 290. The servers 230 can optionally include location based service application 240, location determination application 250, and a recommendation application 260. The database 290 can optionally include merchant databases 292, user profile database 294, and/or location history database 296. The mobile device 205 represents one example device that can be utilized by a user to receive offers and share information about missed purchase opportunities. The mobile device 205 may be any of a variety of types of devices (for example, a cellular telephone, a PDA, a Personal Navigation Device (PND), a handheld computer, a tablet computer, a notebook computer, or other type of movable device). The mobile device 205 may interface via a connection 210 with a communication network 105.

Depending on the form of the mobile device 205, any of a variety of types of connections 210 and communication networks 105 may be used.

For example, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 105 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or to other types of networks).

In another example, the connection 210 may be Wi-Fi, IEEE 802.11x type connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 105, for example, via wired or wireless interfaces. These servers 230 may be configured to provide various types of services to the mobile device 205. For example, one or more servers 230 may execute location based service (LBS) applications 240, which interoperate with software executing on the mobile device 105, to provide LBSs to a user. LBSs can use knowledge of the device's location, and/or the location of other devices, to provide location-specific information, recommendations, notifications, interactive capabilities, and/or other functionality to a user. For example, an LBS application 240 can provide location data to a network-based recommendation system 110, which can then be used to assist in generating offers relevant to the user's current location. Knowledge of the device's location, and/or the location of other devices, may be obtained through interoperation of the mobile device 205 with a location determination application 250 executing on one or more of the servers 230. Location information may also be provided by the mobile device 205, without use of a location determination application (such as application 250). In certain examples, the mobile device 205 may have some limited location determination capabilities that are augmented by the location determination application 250. In some examples, the servers 230 can also include recommendation application 260 for providing location-aware group recommendations. In certain examples, location data can be provided to the recommendation application 260 by the location determination application 250. In some examples, the location data provided by the location determination application 250 can include merchant information (e.g., identification of a retail location). In certain examples, the location determination application 250 can receive signals via the network 105 to further identify a location. For example, a merchant may broadcast a specific IEEE 802.11 service set identifier (SSID) that can be interpreted by the location determination application 250 to identify a particular retail location. In another example, the merchant may broadcast an identification signal via radio-frequency identification (RFID), near-field communication (NFC), or similar protocol that can be used by the location determination application 250.

Example Mobile Device

Figure 3:
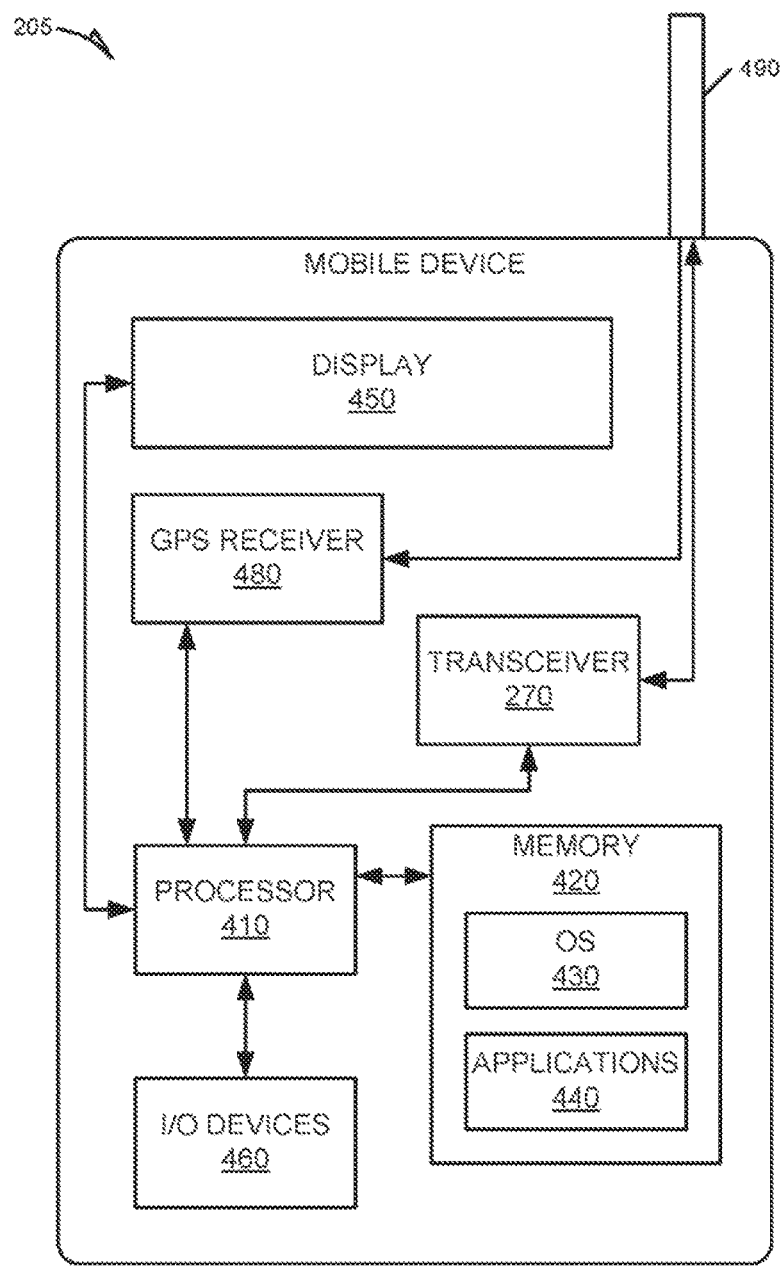
FIG. 3 is a block diagram illustrating a mobile device, according to an example embodiment.

FIG. 3 is a block diagram illustrating the mobile device 205, according to an example embodiment. The mobile device 205 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 330, as well as application programs 340, such as a mobile location enabled application that may provide LBSs to a user. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 490. The transceiver 470 may be configured to both transmit and receive cellular network signals, wireless data signals, or other types of signals via the antenna 390, depending on the nature of the mobile device 205. In this manner, the connection 210 with the communication network 105 may be established. Further, in some configurations, a GPS receiver 380 may also make use of the antenna 390 to receive GPS signals.

Additional detail regarding providing and receiving location-based services can be found in U.S. Pat. No. 7,848,765, titled "Location-Based Services," granted to Phillips et al. and assigned to Where, Inc. of Boston, Mass., which is hereby incorporated by reference.

An important geo-location concept discussed within U.S. Pat. No. 7,848,765 is a geofence. A geofence can be defined as a perimeter or boundary around a physical location. A geofence can be as simple as a radius around a physical location, defining a circular region around the location. However, a geofence can be any geometric shape or an arbitrary boundary drawn on a map. A geofence can be used to determine a geographical area of interest for calculation of demographics, advertising, or similar purposes. Geofences can be used in conjunction with the offer generation and delivery concepts discussed herein. For example, a geofence can be used to assist in determining whether a user (or mobile device associated with the user) is within a geographic area of interest to a particular merchant. If the user is within a geofence established by the merchant, the systems discussed herein can use that information to generate an offer from the merchant and deliver the offer to the user (e.g., via a mobile device associated with the user).

Example Platform Architecture

Figure 4:
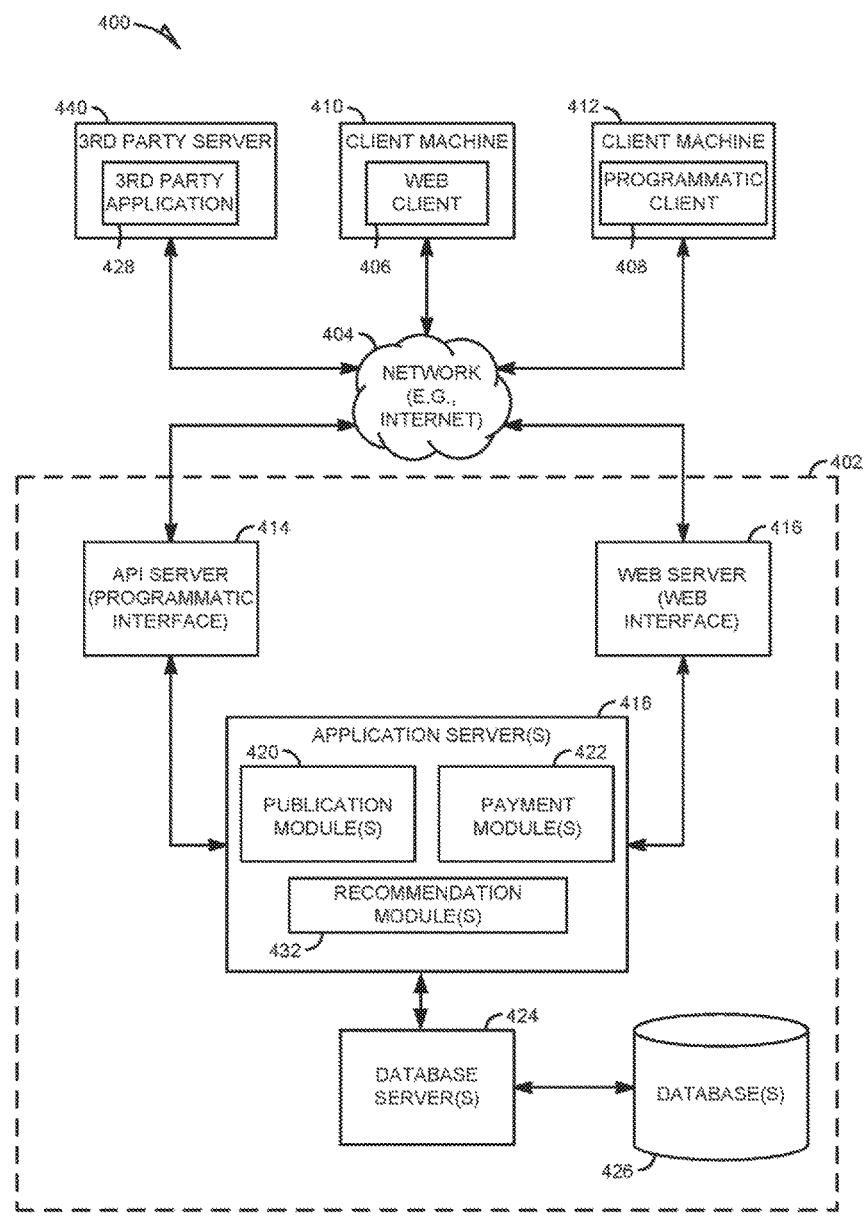
FIG. 4 is a block diagram illustrating a network-based system for delivering location-aware group recommendations, according to an example embodiment.

FIG. 4 is a block diagram illustrating a network-based system 400 for delivering real-time location-aware group recommendations, according to an example embodiment. The block diagram depicting a network-based system 400, within which an example embodiment can be deployed, is described. A networked system 402, in the example forms of a network-based location-aware group recommendation, advertisement, or publication system, provides server-side functionality, via a network 404 (e.g., the Internet or Wide Area Network (WAN)) to one or more clients 410, 412. FIG. 4 illustrates, for example, a web client 406 (e.g., a browser, such as the Internet Explorer browser developed by Microsoft Corporation of Redmond, Wash. State), and a programmatic client 408 (e.g., WHERE smartphone application from Where, Inc. of Boston, Mass.) executing on respective client machines 410 and 412. In an example, the client machines 410 and 412 can be in the form of a mobile device, such as mobile device 205.

An Application Programming Interface (API) server 414 and a web server 416 are coupled to, and provide programmatic and web interfaces respectively to, one or more application servers 418. The application servers 418 host one or more publication applications 420 (in certain examples these can also include commerce applications, advertising applications, and marketplace applications, to name a few), payment applications 422, and recommendation modules 432. The application servers 418 are, in turn, shown to be coupled to one or more database servers 424 that facilitate access to one or more databases 426. In some examples, the application server 418 can access the databases 426 directly without the need for a database server 424.

The publication applications 420 may provide a number of publication functions and services to users who access the networked system 402. The payment applications 422 may likewise provide a number of payment services and functions to users. The payment applications 422 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication applications 420. The payment application 422 may also be configured to present recommendations, generated by the recommendation modules 432, to a user or group of users.

The recommendation modules 432 may provide real-time location-aware group recommendations to users of the networked system 402. The recommendation modules 432 can access user profile data and/or location data that may be stored in database 426. The recommendation modules 432 can be configured to use all of the various communication mechanisms provided by the networked system 402 to present recommendations to users. While the publication applications 420, payment applications 422, and recommendation modules 432 are shown in FIG. 4 to all form part of the networked system 402, it will be appreciated that, in alternative embodiments, the payment applications 422 may form part of a payment service that is separate and distinct from the networked system 402.

Further, while the system 400 shown in FIG. 4 employs a client-server architecture, the present invention is, of course, not limited to such an architecture, and could equally well find application in a distributed, or peer-to-peer, architecture system, for example. The various publication applications 420, payment applications 422, and recommendation modules 432 could also be implemented as standalone software programs, which do not necessarily have networking capabilities.

The web client 406 accesses the various publication applications 420, payment applications 422, and recommendation modules 432 via the web interface supported by the web server 416. Similarly, the programmatic client 408 accesses the various services and functions provided by the publication applications, payment applications, and recommendation modules 420, 422 and 432 via the programmatic interface provided by the API server 414. The programmatic client 408 may, for example, be a local recommendation smartphone application (e.g., the WHERE application developed by Where, Inc., of Boston, Mass.) to enable users to receive real-time location-aware recommendations on their smartphones leveraging user profile data and current location information provided by the smartphone.

FIG. 4 also illustrates a third party application 428, executing on a third party server machine 440, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide recommendations for locations, items, or services associated with the networked system 402 through the recommendation modules 432. Additionally, the application server 418 may access advertisement data via a third party system, such as the third party server 440.

Example Recommendation Modules

Figure 5:
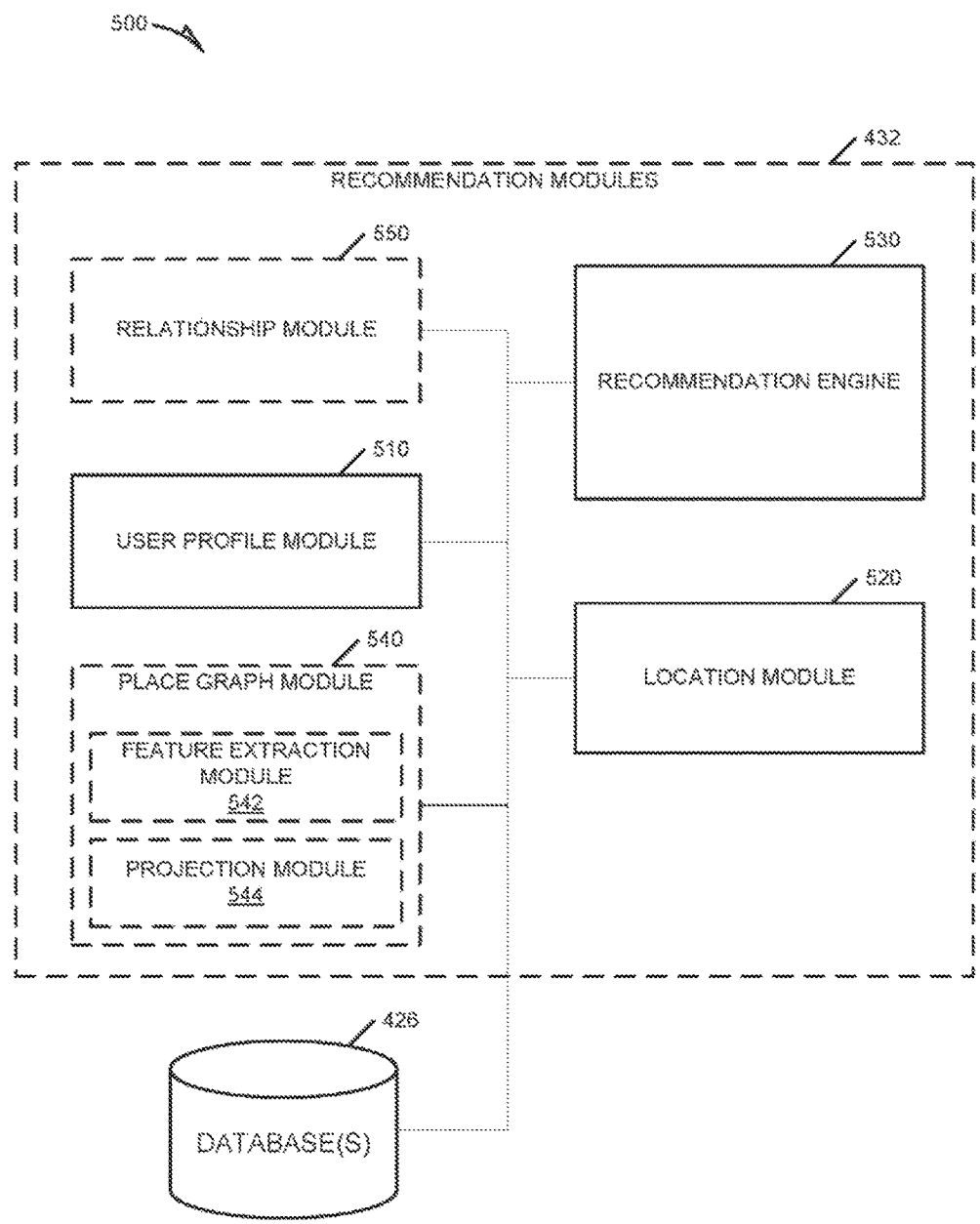
FIG. 5 is a block diagram illustrating recommendation modules, according to an example embodiment.

FIG. 5 is a block diagram illustrating a system 500 including the recommendation modules 432 capable of generating location-aware group recommendations, according to an example embodiment. In this example, the recommendation modules 432 can include a user profile module 510, a location module 520, and a recommendation engine 530. Optionally, the recommendation modules 432 can include a place graph module 540 and a relationship module 550. The place graph module 540 can optionally include a feature extraction module 542 and a projection module 544. In this example, the recommendation modules 432 can access database 426 to store and/or retrieve user profile data as well as information about local places (also referred to as location data).

In an example, the recommendation engine 530 obtains data from the user profile module 510 and the location module 520 to generate a group recommendation. The user profile module 510 can receive information identifying users within a group (e.g., members) and can use that information to access user profile data associated with each of the users. In some examples, the user profile module 510 accesses user profile data stored in databases 426. In other examples, the user profile module 510 can access user profile data stored in third party systems across the network 404. For example, in certain examples, the user profile module 510 can access a social network associated with one of the users (user X) to obtain user profile data for user X and can potentially also access information related to other users within the group (provided the other members are within user X's social graph and user X has sufficient access privileges). In certain examples, the relationship module 550 can also assist in determining relationships between the users in a particular group.

In an example, the place graph module 540 can generate a place graph for the current location based on user profile data and location data. In some examples, the location data can be provided by the location module 520. In certain examples, the place graph module 540 includes a feature extraction module 542 that can invoke algorithms, such as PCA and SVD, to extract a feature matrix for a first plurality of places that have interactions associated with them in the user profile data. The feature extraction module 542 can also use both explicit and implicit user interactions associated the plurality of places to score each of the extracted features. The explicit and implicit user interaction data can be stored within the user profile data. The projection module 544 can project the feature matrix onto a second plurality of places provided by the location module 520. In some examples, the second plurality of places is derived from a different geographic location that does not necessarily include any places in common with the first plurality of places. In an example, the projection module 544 can use a spatial search (e.g., center point and radius) around a current location to filter places around a user based on the new places feature values. In this example, the filter will show only places that have feature values similar to the feature values within the feature matrix derived from the user profile data. Finally, the recommendation engine 530 can merge the output of the place graph module 540 for a group of users (two or more) to produce a location-aware recommendation for a particular group of users in a particular location. In certain examples, the recommendation engine 530 maintains a list of recommended places for a particular group of users in a particular location. The recommendation modules 432 can continually update the list of recommended places as location data associated with the group of users is updated by the location module 520.

In an example, the recommendation engine 530 can merge multiple place graphs generated by the place graph module 540. The recommendation engine 530 can merge place graphs by calculating a group place graph using individual place graphs for each member of the group as input. The following paragraph provide an example method for calculating individual place graphs and discuss how a similar method is used to produce the merged group place graph.

In an example a place graph can be constructed for an individual can be constructed by merging the place graphs of his/her favorite places. In an example, a place graph can be constructed for a favorite place by constructing a Directed Acyclic Graph (DAG) starting with the favorite place as a root location (the "root"). For each place (location) directly related to the root an edge is created connecting the place with the root. The edge is weighted by the similarity calculated based on user's preferences and location information computed between the new place and the root place. A rank of 1 is set for the new place with the edge representing the connection weight. Building an individual's place graph continues by recursively building the rest of the graph to a predetermined depth, according to the following operations. First, for a node N with rank r, each "similar" place is considered (similarity calculated based on user preferences and location information). Each place will either need to be added to the graph with rank r+1 or already exists in the graph with rank r+1. If the place (node N) already exists in the graph with rank <=r, then no edge is added to prevent cycles. Next, edges are added to connect each "similar" place to N. Edge weights are assigned according to their similarity with N.

In this example, constructing a place graph continues with node scoring. Node score can include normalizing weights, grouping incoming edges, and processing each rank r in the resulting set. Node scoring starts by normalizing the weight of the edges to the parents of N so that they sum to 1. Next, the incoming edges to N are grouped by their ranks. Finally, for each rank r in the resulting set a sum of rank socres for each edge is computed and scaled by Logistic(r). each constituent term in this sum is computed by raking the product of the edge weight and the parent's score for the edge in question. Then, the overall score is the sum of these rank scores, according to the following formula:

$$Score(N) := Sum\_i(Sum\_j \ (edge\_weight\_j * parent\_score\_j)/Logistic \ (rank\_i))$$

$$Logistic(x) := 1/1 - e\hat{}-(beta*x)$$

The logistic function is used in this example to get a smotth s-shaped decay of the importance of a place with rank. Note, beta in the above function is an empirically determined value.

The place graph(s) calculated according to the above operations are for an individual root location. In order to construct a place graph for a person place graphs for each of the person's favorite places are merged into a single place graph. In an example, a person's place graph is created by merging the place graphs for each of the person's favorite places by creating a new root node, connecting the root node of each favorite place to it. For each place graph, P_i, the place graph's node set, N_i, and edge set, E_i, are processed as follows. For the node set, N_i, a union of all {N_i} is calculated and labeled N. For the edge set, E_i, a union of all {E_i} is calculated and labeled E. The composite place graph P, is then the combination of N and E, subject to pruning to prevent cycles. Next, the place graph P is ranked. Ranks are recomputed such that each node's rank is the shortest path from it to the root. The place graph, P, is then pruned by deleting edges wherever the target ode has a lower rank than the source node. Finally, scoring is recomputed in the same manner as discussed above for a root location place graph.

Computing a place graph for a group is similar to what was done for each individual person's place graph. Group place graphs can be created by merging using the same algorithm that was used above to create the place graph for a person. A new root node representing the group is created and connected to the roots of each constituent person's place graph. The new group place graph is then reconstituted, ranked, pruned, and scored as discussed above.

Additional details regarding the functionality provided by the recommendation modules 432 are detailed in reference to FIGS. 6-9.

Example Methods

Figure 6:
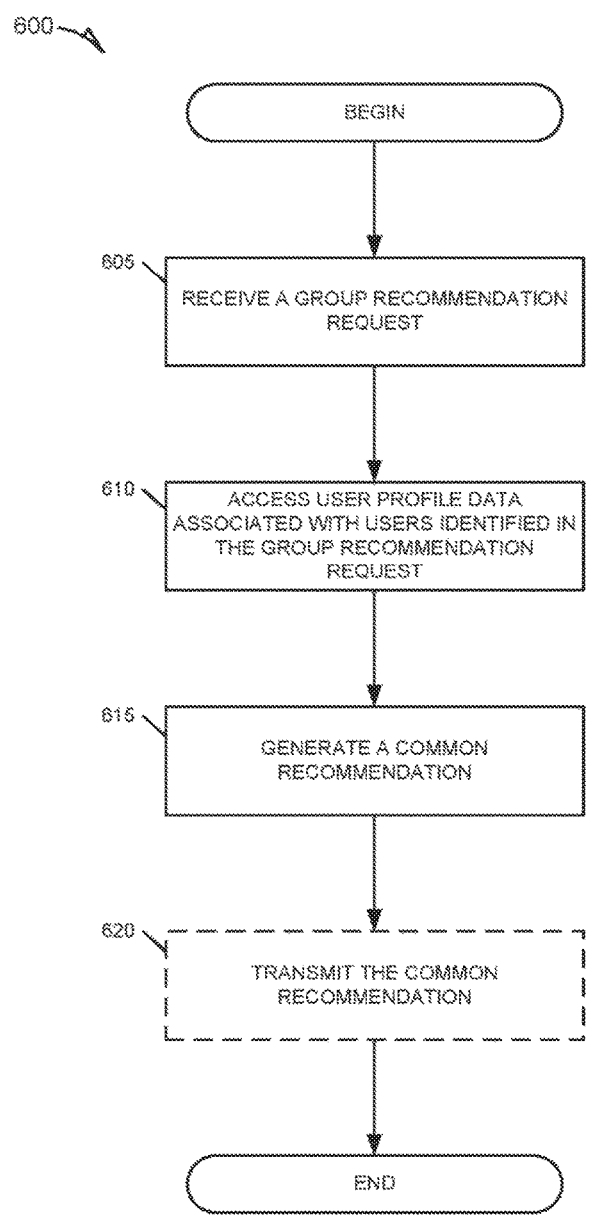
FIG. 6 is a flowchart illustrating a method for generating location-aware group recommendations, according to an example embodiment.

FIG. 6 is a flowchart illustrating a method 600 for generating location-aware group recommendations, according to an example embodiment. In an example, the method 600 can include operations for: receiving a group recommendation request 605, accessing user profile data at 610, generating a common (group) recommendation at 615, and optionally transmitting the common recommendation at 620. The method 600 can being at 605 with a group recommendation request being received by the network-based recommendation system 110. The group recommendation request can include the identification of two or more users and data representing a current location associated with the users. In certain examples, the recommendation request can also include user profile data for one or more of the users.

At 610, the method 600 continues with the network-based recommendation system 110 accessing user profile data associated with the users identified in the group recommendation request. The network-based recommendation system 110 can access user profile data from various sources including the recommendation request, internal databases, or third party sources accessed over the network 105.

At 615, the method 600 can continue with the network-based system 110 generating a common recommendation based on the user profile data accessed for the users identified within the group recommendation. For additional details on an example of group recommendation generation, see below in reference to FIG. 7. At 620, the method 600 can conclude with the network-based recommendation system 110 transmitting the group recommendation to one or more users, such as user 120A or users 120.

Figure 7:
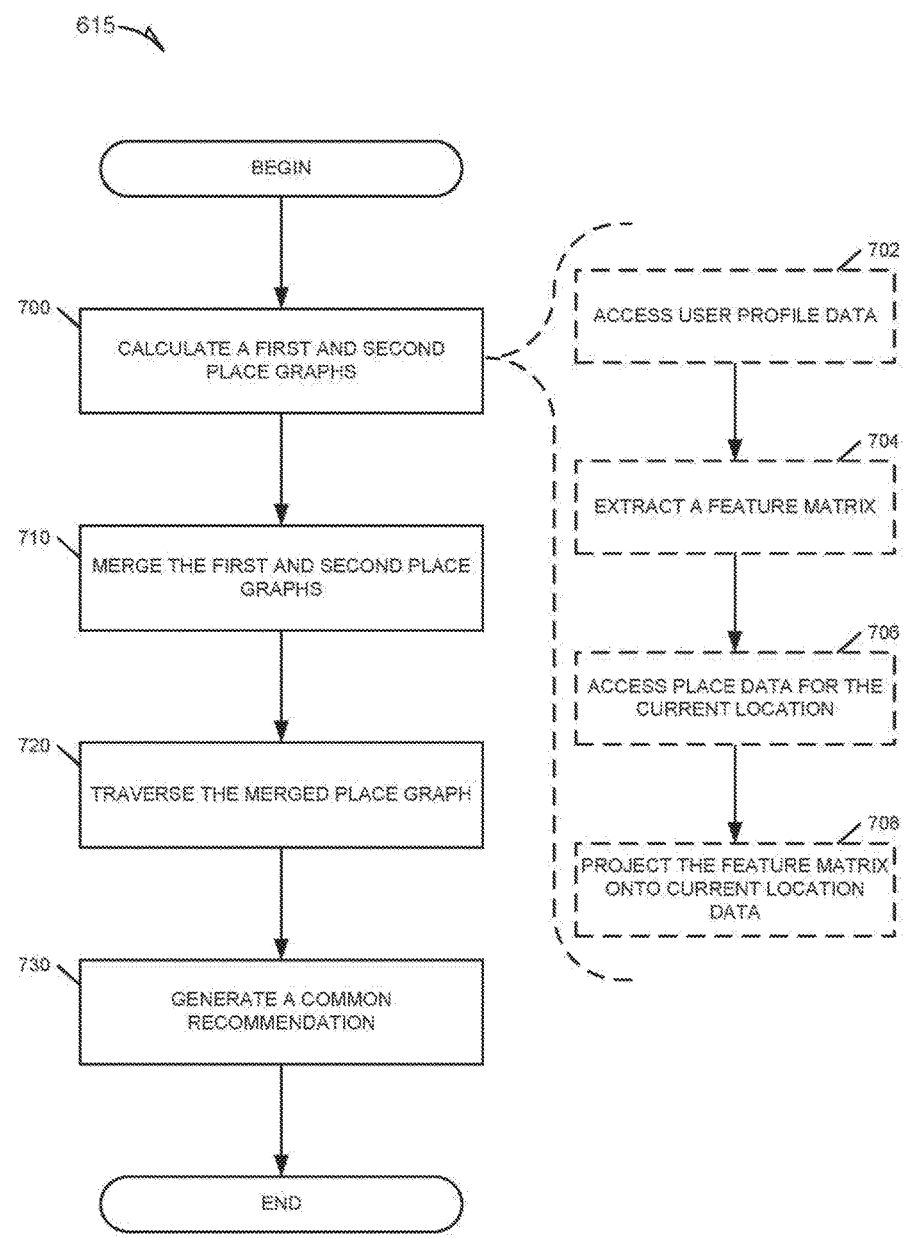
FIG. 7 is a flowchart illustrating a method for generating location-aware group recommendations, according to an example embodiment.

FIG. 7 is a flowchart illustrating a method 615 for generating location-aware group recommendations, according to an example embodiment. In an example, the method 615 can include operations for: calculating first and second place graphs at 700, merging the first and second place graph graphs at 710, traversing the merged place graph at 720, and generating a common recommendation at 730. In certain examples, the method 615 can optionally include operations for accessing user profile data at 702, extracting a feature matrix at 704, accessing place data for a current location at 706, and projecting the feature matrix onto the current location data at 708. In these examples, operations 702 through 708 can be performed to calculate each place graph of the first and second place graphs.

The method 615 can begin at 700 with the place graph module 540 calculating a first place graph associated with a first user in the group and a second place graph for a second user in the group. If the group contains additional members, additional place graphs can be calculated for each member in the group. At 710, the method 615 can continue with the recommendation engine 530 merging the first and second place graphs. At 720, the method 615 can continue with the recommendation engine 530 traversing the merged place graph. At 730, the method 615 can conclude with the recommendation engine 530 generating a common (group) recommendation from the merged place graph.

In certain examples, the method 615 can include operations 702 through 708 for calculating place graphs. In these examples, the method 615 can start place graph calculation at 702 with the user profile module 510 accessing user profile data to be used by the place graph module 540. At 704, the method 615 can continue with the feature extraction module 542 extracting a feature matrix from the user profile data. At 706, the method 615 can continue with the location module 520 accessing place data for the current location. Finally, at 708, the method 615 can conclude place graph calculation with the projection module 544 projecting the feature matrix onto current location data.

Figure 8:
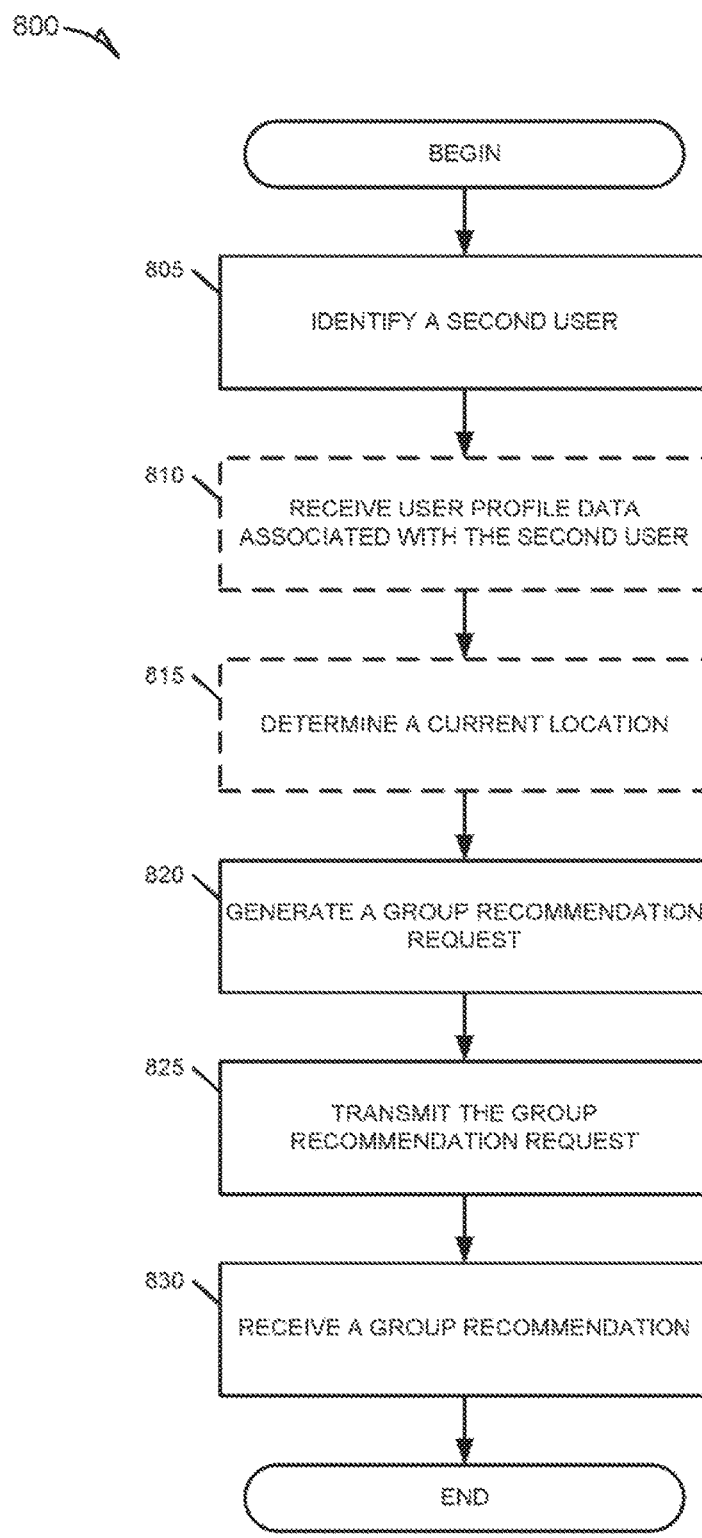
FIG. 8 is a flowchart illustrating a method for receiving location-aware group recommendation on a mobile device, according to an example embodiment.

FIG. 8 is a flowchart illustrating a method 800 for receiving location-aware group recommendations on a mobile device, according to an example embodiment. In an example, the method 800 can include operations for: identifying a second user at 805, generating a group recommendation request at 820, transmitting the group recommendation request at 825, and receiving a group recommendation at 830. The method 800 can also optionally include operations for: receiving user profile data associated with the second user at 810 and determining a current location at 815. At 805, the method 800 can begin with user 120A identifying a second user, such as user 120C, on a mobile device 205 associated with user 120A. Identifying user 120C can include bumping mobile devices with user 120C or selecting user 120C from a list of potential group members. The list of potential group members can be populated based on a social graph associated with the user 120A or by detecting other users within a certain proximity of user 120A (e.g., via NFC, WiFi, Bluetooth, or local check-ins).

At 820, the method 800 can continue with the mobile device 205 generating a group recommendation request. The group recommendation request can include data identifying user 120A and user 120C. In certain examples, the method 800 can also include operation 815 were the mobile device 205 determines a current location associated with user 120A. In these examples, the group recommendation request can also include information indicating a current location. In some examples, the method 800 can also include operation 810 where the mobile device 205 receives user profile data associated with the second user. In these examples, the group recommendation request can further include user profile data for user 120C (e.g., the second user) and may also include user profile data associated with user 120A.

At 825, the method 800 can continue with the mobile device 205 transmitting the group recommendation request to the network-based recommendation system 110 over the network 105. At 830, the method 800 can conclude with the mobile device 205 (associated with user 120A) receiving a group recommendation request in response to the group recommendation request from the network-base group recommendation system 110.

Figure 9:
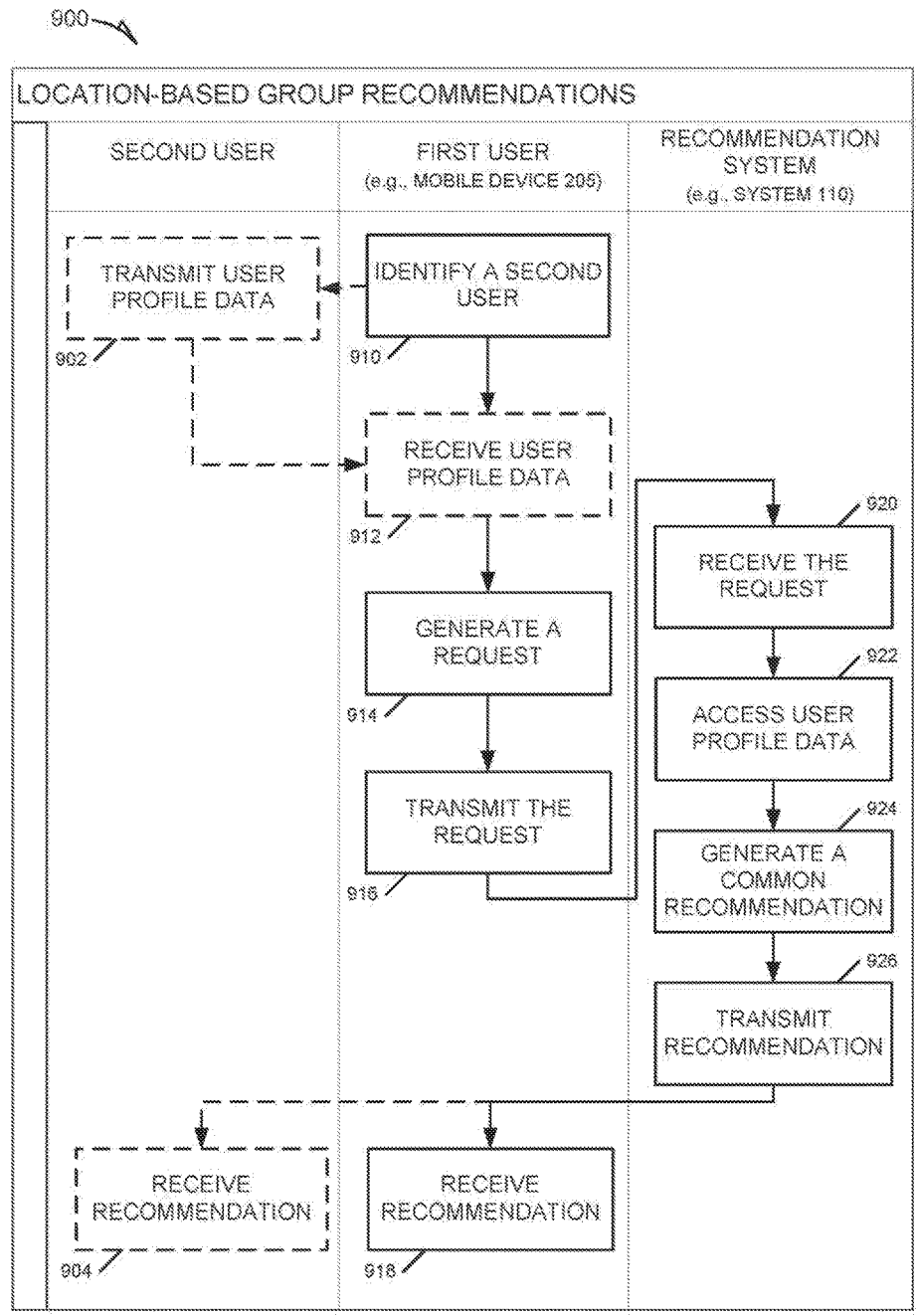
FIG. 9 is a swim-lane chart illustrating a method for generating location-aware group recommendations, according to an example embodiment.

FIG. 9 is a swim-lane chart illustrating a method 900 for generating location-aware group recommendations, according to an example embodiment. The method 900 illustrates interactions between group members (e.g., mobile devices associated with each group member) and the network-based group recommendation system 110, according to an example. In this example, the method 900 can include operations for: identifying a second user at 910, generating a request at 914, transmitting the request at 916, receiving the request at 920, accessing user profile data at 922, generating a common recommendation at 924, transmitting the recommendation at 926, and receiving the recommendation at 918. In certain examples, the method 900 can optionally include operations for: transmitting user profile data at 902, receiving user profile data at 912, and receiving the recommendation at 904.

At 910, the method 900 can begin with the mobile device 205 (associated with a first user, such as user 120B) identifying a second user, such as user 120N. Optionally, at 902 the method 900 can continue with the second user (via a mobile device associated with the second user) transmitting user profile data. At 912, the method 900 can optionally include the mobile device 205 receiving the user profile data associated with user 120N (e.g., the second user). At 914, the method 900 can continue with the mobile device 205 generating a recommendation request for the group including user 120B and user 120N. At 916, the method 900 can continue with the mobile device 205 transmitting the group recommendation request to the network-based group recommendation system 110.

At 920, the method 900 continues with the network-based group recommendation system 110 receiving the group recommendation request. At 922, the method 900 can continue with the network-based group recommendation system 110 accessing user profile data associated with user 120B and user 120N. At 924, the method 900 can continue with the network-based group recommendation system 110 generating a recommendation for the group including user 120B and user 120N. At 926, the method 900 can continue with the network-based group recommendation system 110 transmitting the group recommendation over the network 105. At 918, the method 900 can conclude with the mobile device 205 receiving the group recommendation from the network-based group recommendation system. Optionally, the method 900 can also include operation 904 where the second user (user 120N) receives the group recommendation on a mobile device.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
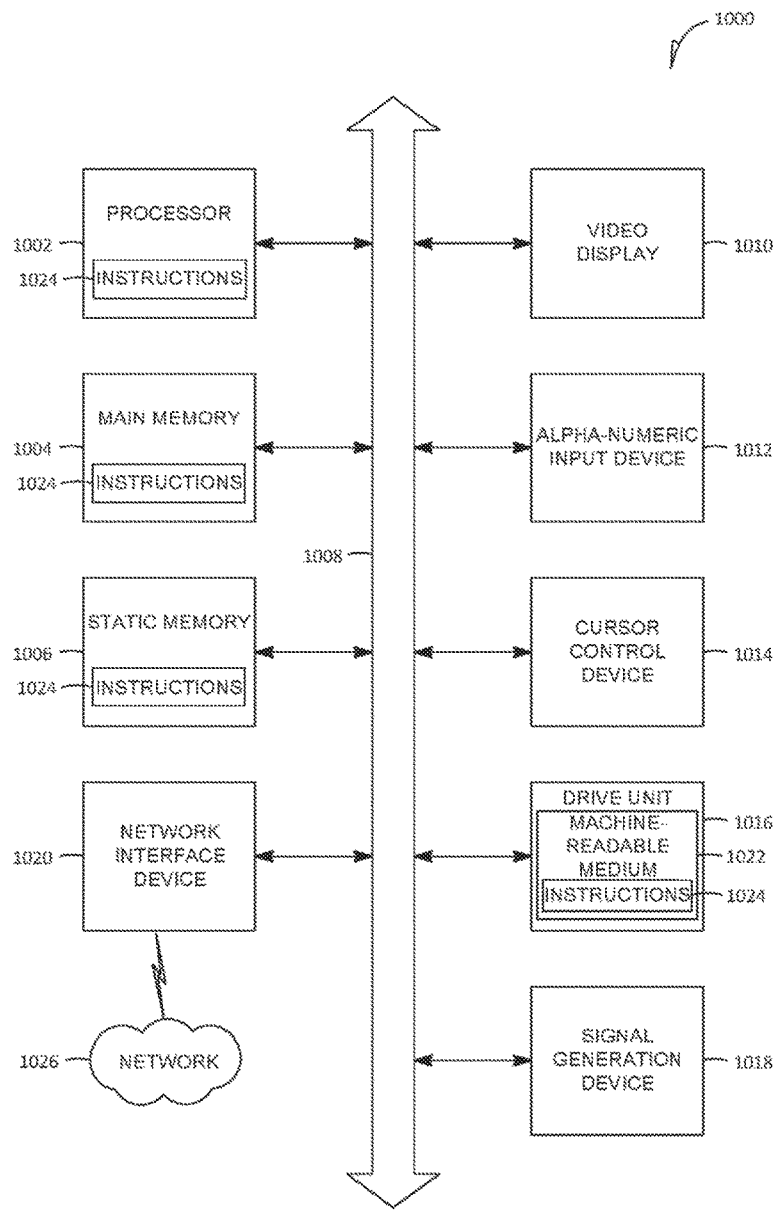
FIG. 10 is a diagrammatic representation of a machine in the example form of a computer system within which a set of instructions for causing the machine to perform any one or more of the methodologies discussed herein may be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or used by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. In some examples, the instructions 1024 may also reside within static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a non-transitory memory storing instructions; and
   a processor configured to execute instructions to cause the system to:
   receive, over a first network connection with a device, a group recommendation request, the group recommendation request including user identification of two or more users, where the group recommendation includes geographical location information;
   accessing, using the user identification of the two or more users, user profile data for the two or more users and information on third party sources accessed over a second network connection by at least one of the two or more users; and
   generating a common recommendation based on the user profile data and the information on the third party sources accessed, the common recommendation including a venue recommendation determined using specialized indexing and retrieval algorithms that identify patterns in the user profile data and the information on the third party sources.

2. The system of claim 1, wherein the geographical location information includes a first geographical location of a first user associated with the device and a second geographical location of a second user from the two or more users identified in the group recommendation request.

3. The system of claim 2, wherein first and second geographical locations and user interactions of the two or more users are used in generating the common recommendation.

4. The system of claim 3, wherein the user interactions include implicit and explicit interactions and wherein the implicit interactions are recorded clicks of the two or more users and explicit interactions are direct inputs of the two or more users.

5. The system of claim 4, wherein the implicit and explicit interactions of the first user are analyzed to extract a first feature matrix and wherein the first feature matrix is projected onto the geographical location of the first user.

6. The system of claim 5, wherein the implicit and explicit interactions of a second user in the two or more users are analyzed to extract a second feature matrix and wherein the second feature matrix is projected onto the geographical location of the second user and where a first place graph is generated using the first feature matrix and a second place graph is generated using the second feature matrix.

7. The system of claim 6, wherein a merge place graph is generated using the first and second place graphs, and wherein the merge place graph is used with the specialized indexing algorithm to generate the common recommendation.

8. A method comprising:
   receiving, over a first network connection with a device, a group recommendation request, the group recommendation request including user identification of two or more users, and where the group recommendation includes geographical location information;
   accessing, by a processor, using the user identification of the two or more users, user profile data for the two or more users and information on third party sources accessed over a second network connection by at least one of the two or more users; and
   generating, by the processor, a common recommendation based on the user profile data and the information on the third party sources accessed, the common recommendation including a venue recommendation determined using specialized indexing and retrieval algorithms that identify patterns in the user profile data and the information on the third party sources.

9. The method of claim 8, wherein the geographical location information includes a first geographical location of a first user associated with the device and a second geographical location of a second user from the two or more used identified in the group recommendation request.

10. The method of claim 9, wherein first and second geographical locations and user interactions of the two or more users are used in generating the common recommendation.

11. The method of claim 10, wherein the user interactions include implicit and explicit interactions and wherein the implicit interactions are recorded clicks of the two or more users and explicit interactions are direct inputs of the two or more users.

12. The method of claim 11, wherein the implicit and explicit interactions of the first user are analyzed to extract a first feature matrix and wherein the first feature matrix is projected onto the geographical location of the first user.

13. The method of claim 12, wherein the implicit and explicit interactions of a second user in the two or more users are analyzed to extract a second feature matrix and wherein the second feature matrix is projected onto the geographical location of the second user and where a first place graph is generated using the first feature matrix and a second place graph is generated using the second feature matrix.

14. The method of claim 13, wherein a merge place graph is generated using the first and second place graphs, and wherein the merge place graph is used with the specialized indexing algorithm to generate the common recommendation.

15. A non-transitory machine-readable medium having instructions stored thereon, the instructions executable to cause performance of operations comprising:
  receiving, over a first network connection with a device, a group recommendation request, the group recommendation request including user identification of two or more users, and where the group recommendation includes geographical location information;
  accessing, by a processor, using the user identification of the two or more users, user profile data for the two or more users and information on third party sources accessed over a second network connection by at least one of the two or more users; and
  generating, by the processor, a common recommendation based on the user profile data and the information on the third party sources accessed, the common recommendation including a venue recommendation determined using specialized indexing and retrieval algorithms that identify patterns in the user profile data and the information on the third party sources.

16. The non-transitory machine-readable medium of claim 15, wherein the geographical location information includes a first geographical location of a first user associated with the device and a second geographical location of a second user from the two or more used identified in the group recommendation request.

17. The non-transitory machine-readable medium of claim 16, wherein first and second geographical locations and user interactions of the two or more users are used in generating the common recommendation.

18. The non-transitory machine-readable medium of claim 17, wherein the user interactions include implicit and explicit interactions and wherein the implicit interactions are recorded clicks of the two or more users and explicit interactions are direct inputs of the two or more users.

19. The non-transitory machine-readable medium of claim 18, wherein the implicit and explicit interactions of the first user are analyzed to extract a first feature matrix and wherein the first feature matrix is projected onto the geographical location of the first user.

20. The non-transitory machine-readable medium of claim 19, wherein the implicit and explicit interactions of a second user in the two or more users are analyzed to extract a second feature matrix and wherein the second feature matrix is projected onto the geographical location of the second user and where a first place graph is generated using the first feature matrix and a second place graph is generated using the second feature matrix.

* * * * *